United States Patent
Boldon (12)

(10) Patent No.: US 6,391,366 B1
(45) Date of Patent: May 21, 2002

(54) SOFT FROZEN BATTER FOR BAKED GOODS AND METHOD OF PREPARATION

(75) Inventor: Douglas G Boldon, New Hope, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/458,417

(22) Filed: Dec. 10, 1999

(51) Int. Cl.⁷ ............................................... A21D 10/04
(52) U.S. Cl. ...................... 426/553; 426/496; 426/552; 426/558
(58) Field of Search ................................. 426/552, 553, 426/562, 550, 391, 393, 496, 498, 556

(56) References Cited

U.S. PATENT DOCUMENTS

| | | | |
|---|---|---|---|
| 2,810,650 A | 10/1957 | Joslin | |
| 2,982,662 A | 5/1961 | Cochran et al. | |
| 4,154,863 A | 5/1979 | Kahn et al. | 426/553 |
| 4,504,510 A | * 3/1985 | Alibeto et al. | 424/440 |
| 4,857,353 A | 8/1989 | Jackson et al. | |
| 4,904,493 A | 2/1990 | Petrizzelli | |
| 4,971,797 A | * 11/1990 | Cherukuri et al. | 426/553 |
| 5,178,893 A | 1/1993 | Seewi et al. | |
| 6,165,524 A | * 12/2000 | Narayanaswamy et al. | 426/128 |
| 6,217,929 B1 | 4/2001 | Hahn | 426/547 |

FOREIGN PATENT DOCUMENTS

| | | |
|---|---|---|
| EP | 0868850 | 4/1997 |
| WO | 99/04640 | 4/1999 |

OTHER PUBLICATIONS

Definition of Sucrose. Chemscape Chime. http://www.chem.ox.ac.uk/mom/carbohydrates/sucrose.html.*
Definition of Maltose. Chemscape Chime. http://www.chem.ox.ac.uk/mom/carbohydrates/maltose.html.*
Hawley, G., Definition of Maltose. The Condensed Chemical Dictionary 10th Ed. Van Nostrand Reinhold co. p. 639. 1981.*

Kulp et al. Freezing and Refrigeration of Cake and Muffin Batters in the United States, Frozen and Refrigerated Doughs and Batters, publisher AACC, St. Paul, 1995, 167–176 (Abstract Only).*

Jana et al., Sweeteners for Frozen Success—a Review., Australian Journal of Dairy Science., vol. 49(2): p. 98–109, 1994.*

* cited by examiner

*Primary Examiner*—Arthur L. Corbin
(74) *Attorney, Agent, or Firm*—John A. O'Toole; Douglas J. Taylor; Everett G. Diederiks, Jr.

(57) ABSTRACT

A ready-to-cook, complete, frozen, reduced density, farinaceous batter which is plastic at frozen temperatures and can be scooped to form cooked goods, especially for food service preparation of baked muffins, comprises about 10 to 40% flour; about 20 to 30% (dry weight basis) of a high maltose corn syrup; about 10 to 20% of edible oil having a melting point of about ≦20° C.; about 0.5% to 5% chemical leavening; said chemical leavening including a baking soda and a blend of baking acids including a fast acting baking acid and a slow acting baking acid; about 1 to 8% of a humectant; a moisture content of about 5% to 20%; and having a browning-type reducing sugars content of less than about 5%, and is chemically leavened to a density of about 0.9 to 1.1 g/cc and has a temperature of about −20° C. to 0° C.

42 Claims, No Drawings

SOFT FROZEN BATTER FOR BAKED GOODS AND METHOD OF PREPARATION

FIELD OF THE INVENTION

The present invention relates to food products and to methods of their preparation. More particularly, the present invention relates to frozen spoonable batters for baked goods and to their methods of preparation.

BACKGROUND OF THE INVENTION

Baking a flour-based batter typically makes muffins or other related finished leavened farinaceous baked goods. The batters can be prepared from scratch forming a batter comprising flour, sugar, salt, water or milk, a fat (e.g., vegetable oil or shortening and/or butter), eggs, leavening, and various optional other ingredients. Also well known are dry mixes where the user prepares a batter by adding liquids to dry ingredients and then cooking the batter soon after its preparation.

Dry mixes that contain all dry ingredients necessary for preparing the batter and requiring only the addition of water or milk to prepare the batter provide more convenience. Such "complete" dry mixes are especially popular in food service applications such as restaurants, cafeterias for schools hospitals, prisons, and other commercially prepared foods inasmuch as the labor and skill necessary to prepare large quantities of high quality prepared foods is minimized. Increasingly, more people spend a greater portion of their food expenditures on such commercially prepared food than on traditional at-home preparation of food. While better restaurants employ highly trained and skilled chefs, a large number of establishments employ low skilled or even illiterate labor for whom instructions as simple as adding equal parts dry mix to water is too complicated to be practical.

Batters that are already prepared and are ready for use would provide even more convenience. However, batters must be used soon after their preparation lest they lose their leavening. Over time, the leavening acids react with and thereby consume the $CO_2$ generating ingredient. Also, batters generally require refrigeration to prevent microbial spoilage. The art includes numerous references directed towards provision of such batters that attempt to overcome either the loss of leavening or spoilage. Leavened farinaceous articles that are shelf stable at room temperatures are known but are quite expensive. (See for example, U.S. Pat. No. 5,178,893 entitled "Product and Process of Making a Room Temperature Storage Stable Dough", or U.S. Pat. No. 4,904,493 entitled "Shelf-Stable Patisserie Dough", or EP 0868850 entitled "Read-to-Bake, Shelf stable cake dough and process for its manufacture"). Often, such products are so low in moisture to be doughs rather than batters. The foods usually include coated leavening ingredients to minimize reaction during storage.

Since both spoilage and leavening reactions are temperature dependent, greater storage stability is more easily obtained with refrigerated batters. However, such refrigerated batters nonetheless require coating or physically sequestering one or more of the leavening ingredients and protection against microbial spoilage such as heat treatment or ultra high-pressure sterilization. Once a container is opened, the balance of the batter must be used soon thereafter to minimize microbial spoilage.

Also known are unaerated frozen batters for baked goods for foodservice that are sold in gallon sized tubs. However, the products are frozen solid blocks at freezer temperatures and require up to 36 hours of refrigerated temperature thawing prior to use. The thawed products must be used within a short period of time. While capable of being refrozen, use after being refrozen suffers from inconsistent or poor baking properties.

The present invention provides further improvements in food services batters for baked goods. In particular, the present invention provides complete batters that require no further addition of ingredients or further processing prior to baking. The present invention further provides batters that can be stored for extended times without disabling loss of leavening. Surprisingly, containers of the present batters can be partially used and allows for return of the unused portion of the batter to storage without fear of spoilage or loss of leavening or other functionality. The present batters are provided in a form that is easy to use and is less messy to use than conventional liquid batter products. The present batters are easily formed into desired sized quantities for baking.

The present advantages are provided by complete batters that are chemically leavened with quick acting leavening prior to freezing to form aerated deformable leavened complete baking batters. The batters further essentially comprise a slow acting leavening acid that is activated during the baking cycle to provide leavening during baking. Thus, the present foods are to be distinguished from those dry mix compositions and batters made therefrom that are described in U.S. Pat. No. 4,857,353 entitled "Dry Mix For Microwave Layer Cake" that issued in August 1989. The dry mixes of the '353 patent comprise full formulation dry mixes for layer cakes including importantly the combination of a "nucleating agent" and only a fast acting chemical leavening system. Those batters are not taught to be chemically leavened at room temperature prior to freezing.

SUMMARY OF THE INVENTION

In its product aspect, the present invention resides in frozen complete partially leavened spoonable leavening containing ready-to-bake batter articles.

The batter essentially comprises flour, water, fat, about 20 to 30% (dry weight basis) of a high maltose corn syrup and the balance of conventional batter ingredients such as starches, flavors (e.g., chocolate), egg or egg solids, humectants, gums, salt, etc. The batters contain less than about 5% of conventional reducing or browning sugars such as sucrose, fructose, dextrose, lactose, honey etc. The batters are chemically leavened to a density of about 0.9 to 1.0 g/cc prior to freezing to temperatures ranging from about to −20° C. to 0° C. In certain embodiments, the batter contains protected leavening.

A. about 10 to 40% flour;
B. about 20 to 30% (dry weight basis) of a high maltose corn syrup;
C. about 10 to 20% of edible oil having a melting point of about ≦20° C.;
D. about 0.5% to 5% of a chemical leavening system;
E. about 1 to 8% of a humectant selected from the group consisting of glycerol, sorbitol, xylitol, propylene glycol and mixtures thereof;
F. about 0.1% to about 1% nucleating agent;
G. a moisture content of about 5% to 20%; and having a browning-type reducing sugars content of less than about 5%, and wherein the batter is chemically leavened to a density of about 0.9 to 1.1 g/cc.

The batter is soft and scoopable at frozen temperatures and can be scooped right out of the freezer into baking containers, e.g., muffin tins, and baked into muffins.

In its process aspect, the present invention is directed to processes for making a frozen chemically leavened ready-to-bake batter article. The process comprises the steps of:

Admixing to form a batter:
A. about 10 to 40% flour;
B. about 20 to 30% (dry weight basis) of a high maltose corn syrup;
C. about 10 to 20% of edible oil having a melting point of about $\leq 20°$ C.;
D. about 0.5% to 5% chemical leavening; said chemical leavening including at least a first fast acting leavening acid and a second slow acting leavening acid and a baking soda;
E. about 1 to 8% of a humectant selected from the group consisting of glycerol, sorbitol, xylitol, propylene glycol and mixtures thereof;
F. about 0.1% to about 1% nucleating agent;
F. a moisture content of about 5% to 20%; and having a browning-type reducing sugars content of less than about 5%, and forming a chemically leavened batter having a density of about 0.9 to 1.1 g/cc by allowing the fast reacting leavening acid to react with a portion of the baking soda; and, Quiescently freezing the chemically leavened batter to form a scoopable frozen batter having a slow acting chemical leavening system.

DETAILED DESCRIPTION OF THE INVENTION

The present invention relates to frozen spoonable complete leavened ready-to-bake batters for baked goods characterized by extended shelf stability at frozen temperature and to their methods of preparation and use. Each of the product components as well as product use and attributes and methods of their preparation are described in detail below.

Throughout the specification and claims, percentages are by weight and temperatures in degrees Fahrenheit unless otherwise indicated.

Batters and doughs are distinguishable compositions even though each comprises some number of common ingredients.

"Dough" as used herein refers to an intermediate food product that has a gluten based structure. In dough, the gluten forms a continuous dough elastic medium into which other ingredients are embedded. A dough is typically prepared by beating, blending, cutting or kneading and is often stiff enough to cut into various shapes. Doughs generally are used for low sugar to flour ratio products such as breads, biscuits, etc. Doughs while plastic are not flowable.

In contrast, "Batter" as used herein refers to an intermediate food product that essentially contains flour, water, and salt and optionally fat, eggs, and sugar(s) that are a starch batter based composition. In a batter, gluten development is purposefully minimized. Batters are inelastic and are more flowable than dough. Liquid added to make the batter forms a continuous batter medium in which other ingredients are dispersed. A batter cooks into a soft, moist and sometimes crumbly product. A batter is typically prepared by blending, creaming, stirring or whipping and is generally thin enough to pour or scoop or squeeze out of a container.

Flour

The present batter compositions essentially contain flour. Good results are obtained when the present batters comprise from about 10 to 40% (dry weight basis) of flour. Preferred for use herein are frozen batters that comprise about 20% to 40% flour and, for best results, about 25 to 30% flour.

Conventionally, flour is standardized to about 14% moisture. However, dried flours with considerable lower moisture contents can also be used. Flour(s) useful herein can be of conventional type and quality including cake flour, bread flour and all-purpose flour. Wheat flours are preferred but other flours conventionally used in the preparation of baked goods can also be employed in full or partial substitution for the wheat flour. Traditional cake flour used for layer cakes has about 8% or less protein by weight of the flour. Pastry flour ordinarily has a protein level of about 10%. Other flours such as bread flour generally have higher protein levels of about 11 to 13% by weight. The preferred protein range for the wheat flour useful in this invention is between about 7 to 10% by weight of the flour. All-purpose flour also can be used. Such all-purpose flour generally comprises a mixture of both hard and soft wheat flours, i.e., both high protein level and low protein level flours. Such flours are useful if the average protein content ranges from about 7 to 10% by weight.

Both chlorinated or unchlorinated flours can be used depending on the application. However, malted flours that are typically used for bread making should be avoided. Unmalted flours selected for use herein should be of high quality and desirably are from wheats with minimal sprout damage. Enzyme inactivated flours can also be used.

Maltose

The present batter compositions essentially comprise a high maltose corn syrup. Good results are obtained when the present batters comprise from about 20 to 30% (dry weight basis) of a high maltose corn syrup. Preferred for use herein are frozen batters that comprise about 20% to 40% high maltose corn syrup and for best results about 25 to 40% high maltose corn syrup. Employment of high maltose corn syrup within the above range provides benefits of lowering the water activity and freezing point of the batter while promoting the scoopability of the frozen batter.

Conventionally, high maltose corn syrup is standardized to about 14% moisture. However, dried high maltose corn syrup with considerable lower moisture contents can also be used By "high maltose" is a syrup or syrup solids that has at least 64% maltose. Such high maltose syrups are readily commercially available such as from Cargil Inc. under the trade name "Satin Sweet". Maltose and maltose syrups or syrup solids are selected for use herein since such sugars are not browning-type reducing sugars, or are at least much less prone towards promoting browning. Reducing sugars, such as sucrose, fructose, lactose, dextrose, or mixtures of reducing sugars undesirably promote browning in the finished baked good. The browning can occur both on the surface and in the interior of the baked good. Exemplary sources of reducing sugars include invert syrup, high fructose corn syrup, molasses, brown sugar, maple syrup, mixtures thereof, and the like. Unfortunately, maltose syrups provide only about one half of the sweetening power of sucrose. Thus, the present batters are essentially characterized by having a browning-type reducing sugars level of 5% or less. In certain embodiments, the present batters comprise about 3% to about 5% of ground sugar such as cake grind having a mean particle size distribution of 150 microns. Such a grind of sugar is broadly used in preparing batters for a variety of finished baked goods such as muffins, layer cakes, cookies, and brownies. In certain embodiments for particular items especially for brownies, a smaller particle size (e.g. powdered sugar) is preferred. In more preferred embodiments, the present batters are essentially free of dextrose, fructose, lactose, and glucose whether provided in pure form or from ingredients such as honey or maple syrup that comprise these sugars.

In highly preferred embodiments, the weight ratio of maltose to water ranges from about 1.5 to 1 to about 3 to 1 (1.5–3:1), preferably about 2–2.5:1.

Liquid Oil

The present batters can also comprise from about 0% to 25% of liquid oil at room temperature, i.e., having a melting point of about 20° C. or below, preferably about 10% to 25% and for best results about 10% to 15%. A liquid oil ingredient adds richness to the eating properties of the finished baked goods. The particular oil ingredient level will depend particularly upon the desired type of finished baked good desired and its properties. Maintenance of shortening concentrations within these limits is important for providing baked goods of acceptable textural quality. In addition to providing desirable eating qualities to the finished baked good, the Liquid oil ingredient provide the advantage of helping to keep the frozen batters scoopable. All percentages are descriptive of added oil and are not meant to include fat or lipid content that may be included in the finished product from other ingredients, liquid eggs.

In preferred embodiments, the batters comprise a quantity of an added edible oil that is liquid at room temperature and having a melting point 70° F. (21° C.) or less. Good results are obtained when the oil used herein has a melting point ranging from about 30 to 70° F., preferably about 30 to 60° F. (0 to 15° C.) and for best results about 30 to 50° F. It will appreciated that oils characterized by a particular melting point, e.g., 50° F., may actually have about 2–3% solids at 50° F. (10° C.). However, these solids are not visible at this temperature. Highly preferred oil herein has a nominal melting point of 50° F. and solid fat index of less than 8% solids at 50° F. and about 2% at 70° F.

Winterization of the oils is not essential but winterized or dry fractionated partially hydrogenated oils can be used herein. For example, un-hydrogenated genetically modified oils may be used in addition to lightly hydrogenated or partially hydrogenated oils. For best results, the food charge is substantially free (<6) of any added fat ingredient that has a melting point higher than 50° F. The oil is preferably fortified with anti-oxidants, e.g., up to 200 ppm of vitamin e, BHA, bht and mixtures thereof. In less preferred variations, the oils can be lightly or partially hydrogenated to increase stability so long as the degree of hydrogenation does not raise the melting point of partially hydrogenated oil to above 70° F.

Representative of such liquid oils are provided by such vegetable oil sources such as soybean oil, coconut oil, palm kernel oil, cottonseed oil, peanut oil, olive oil, sunflower seed oil, sesame seed oil, corn oil, safflower oil, poppy seed oil, soybean oil, canola (rapeseed) oil, babassue oil and mixtures thereof. Animal oils such as butter oil can be used but are expensive. Marine oil sources such as fish oil, e.g., menhaden oil, can be used if purified and stabilized against odor and flavor generation. While such marine oils provide desirable nutritional benefits such as including high levels of omega 3 fatty acids, such marine oils are expensive and prone to development of off flavors and odors. Other suitable oil materials and methods of oil preparation are described in detail in Bailey, "Industrial Oil and Fat Products," (3rd ed. 1964) which is incorporated herein by reference.

The room temperature liquid oils used herein can be supplied by vegetable tropical oils such as coconut oil and palm kernel oil, although present consumer health trends disfavor utilization of such oils. Also useful herein are non-absorbable fat mimics such as polyglycerol esters. However, since the oils must be liquid at room temperature (i.e., below body temperature), such materials are much less preferred due to potential gastric problems.

In preferred embodiments the liquid oil is characterized by low levels of trans fatty acids. More particularly, the oil components herein have trans fatty acid levels of less than about 30%. The liquid oil can include butter flavors and low levels of butter oil, if desired.

Solid fats or shortening that are solid or semi solid at room temperature should be avoided since such fats can adversely effect the scoopability of the frozen batters.

Leavening

The present batters further essentially comprise a chemical leavening system. In general, such systems are composed of a baking soda, e.g., sodium, potassium, or ammonium bicarbonate, etc., as a source of carbon dioxide on one hand, and one or more other common baking acids on the other. Preferred for use herein as the baking soda is sodium bicarbonate.

The preferred chemical leavening system includes any baking soda and a mixture of baking acids. The baking acid mixture typically comprises a first, fast-reacting baking acid and a second, slow-reacting baking acid.

Exemplary useful fast acting baking acids can be selected from the group consisting of citric acid, lactic acid, acetic acid, propionic acid, cream of tartar, monocalcium phosphate monohydrate, fast acting sodium acid pyrophosphate and mixtures thereof. The preferred acid is monocalcium phosphate monohydrate.

The baking acid mixture further comprises a second, slow reacting baking acid selected from the group consisting of monocalcium phosphate and anhydrous sodium aluminum phosphate and dicalcium phosphate, and mixtures thereof.

In the preferred embodiment, the weight ratio of the first baking acid to the second baking acid is about 0.75:1 to 1.25:1.

The weight ratio of the mixture of fast and slow baking acids to the baking soda is about 0.75:1 to 1.25:1, preferably about 1:1.

The fast acting baking acid reacts with a portion of the baking soda upon batter formation. This reaction in combination with nucleating agents provides for chemical leavening of the batter prior to freezing. It will be appreciated that the prepared frozen batter will then have these leavening acids in the form of reaction product salts rather than in their pure form as initially added.

In the preferred embodiment, no portion of the baking soda is encapsulated or otherwise sequestered so as to be unable to react with the fast acting leavening acid to leaven the batter prior to freezing. In a less preferred variation, a portion of the baking soda is encapsulated such as with an edible fat while a portion is not. The free portion of the baking soda is then available to react with the fast acting baking acid while the encapsulated balance of baking soda is protected against premature interaction during storage. These encapsulated leavening agents are not activated until heated at the time of baking. During the baking step, the encapsulating fat melts allowing the soda to be exposed to and react with the slow acting baking acid.

Good results are obtained when the leavening system comprises about 0.5% to 5%, preferably about 1% to about 4% of the batter.

Humectants

The batters further essentially comprise about 1 to 8% of a humectant, preferably about 1% to 6%. Humectant addition is helpful to achieve the present essential water activity level and depress freezing point and the microbial shelf stability at room temperature provided by the present articles. Addition of high levels of humectants can lead to perceptible off-flavors associated with the humectants. The humectant can be any commonly employed humectant ingredient. Preferred humectants are selected from the group consisting of sorbitol, xylitol, mannitol, glycerin, glycerol, propylene glycol and mixtures thereof. Preferred for use herein is glycerin or glycerin by itself or a mixture of sorbitol and glycerin.

Moisture

The present batters have total moisture content between 5% and about 20% moisture, preferably about 5% to 15%. The total moisture includes water provided with or associated with the various essential and optional ingredients. For example, total moisture includes the moisture associated with flour, starch, cocoa and liquid eggs if used. The total moisture can be easily determined by vacuum oven drying of the batters herein. In some embodiments, no added water is employed to formulate the present batters. Rather, only pasteurized liquid eggs provide moisture and the residual moisture associated with the dry ingredients. While in other embodiments dry egg solids are added, water is added to the batter as part of an emulsion or dispersion containing other active ingredients such as emulsifiers, polyols, etc. At higher moisture levels, the frozen batters become too hard to scoop out and use.

The particular selection of ingredients and concentration are selected to provide batters having a water activity of less than 0.85 and for best results less than 0.85 to about 0.55. Selection of such water activity value is important to achieving a balance between microbial shelf stability and frozen batter handling characteristics. The selection and concentration of ingredients provides freezing point depression that keeps the batters spoonable even at freezer temperatures. As a result, the extended thawing step at refrigerator temperatures can be and is desirably eliminated.

Emulsifiers

The present batters can optionally further comprise about 0.1–6% of emulsifier(s), preferably at least a portion of which is prehydrated. The shortening provides a convenient carrier for addition of emulsifiers to the batter. Such emulsifiers aid the realization of baked goods with improved grain structure and texture. The emulsifiers used herein help in not only creating numerous gas cells and finely dispersing and stabilizing them in the batter, but they also maintain the emulsion integrity of the batter over extended room temperature storage.

A portion of the emulsifier(s) component can be admixed with the shortening component in which case the emulsifiers are not prehydrated. Therefore higher amounts of emulsifiers are needed than when hydrated emulsifiers are used. The emulsifier typically comprises from about 1 to 20% of the shortening component, preferably from about 5 to 15% and, most preferably from about 10 to 15%.

However, at least a portion of the emulsifiers are prehydrated in an aqueous dispersion and added to the batter in their prehydrated form. In preferred embodiments, the batters comprise about 0.1–6% prehydrated emulsifiers in addition to any emulsifiers that are otherwise added such as being blended into the fat or shortening component. The prehydrated emulsifiers can also be part of an emulsion or dispersion with or without a fat component.

Generally useful as the emulsifiers are partially esterified polyhydric compounds having surface-active properties. This class of emulsifiers includes among others mono and diglycerides of fatty acids, organic acid esters of monoglycerides, and fatty acid esters. Mono and di-glycerides of fatty acids such as monostearin are commonly used emulsifiers. Preferably they are added as distilled monoglycerides because of their improved purity and better functionality due to decreased interference from diglycerides.

Organic acids such as acetic acid, lactic acid, citric acid, diacetyltartaric acids are used to form esters with monoglycerides to give Acetem, Lactem, Citrem, and Datem respectively. These fall under the category of organic acid esters of monoglycerides. Some of the subclasses of emulsifiers included in the fatty acid ester category are:

Polyglycerol esters of fatty acids (PGE's) wherein the glycerol moiety can be up to 10 or more glycerol molecules and the fatty acids can be Palmitic acid, Oleic acid, Stearic acid etc.; Propylene Glycol fatty acid ester (PGME's) with stearic acid such as Propylene glycol monostearate (PGMS) etc.; Sorbitan Fatty acid ester which are esters of fatty acids with sorbitol anhydride or sorbitan. Some examples are Sorbitan MonoStearate (Span 60) and sorbitan monooleate (Span 80). Sorbitan esters can be reacted with ethylene oxide to form Polyoxyethylene sorbitan esters such as Polysorbate 60 (polyoxy-20-ethylene sorbitan stearate), polysorbate 80 (polyoxy-20-ethylene sorbitan oleate), polyoxyethylene sorbitan monostearate (Tween 60), and polyoxyethylene sorbitan monooleate (Tween 80), etc.; Sodium Steroyl Lactylate (SSL); Sorbitan Tristearate (STS);Sucrose ester of fatty acids.

Another class of emulsifiers called phospholipids (for e.g. Lecithin) can also be used.

Liquid eggs

In highly preferred embodiments, the present batters can further comprise pasteurized liquid eggs. The pasteurized liquid eggs or frozen whole eggs provide desirable structuring, emulsification, nutritional benefits to the present batters. Pasteurized liquid eggs also provide at least a portion of the total moisture of the batters. If present the liquid eggs comprise about 1% to 10% (wet basis), preferably about 5 to 10%. It will be appreciated that liquid eggs comprise about 75% moisture. In less preferred embodiments, the liquid eggs can be replaced in whole or in part with dried egg solids or egg fractions in solid form, e.g., egg yolk solids and egg white solids.

Sucralose

In highly preferred embodiments, the present batters can further comprise a high potency heat tolerant sweetener. Since the maltose ingredient has a lower sweetening taste than sucrose, in preferred embodiments a supplemental high potency sweetener can be employed to provide additional sweetness. Preferred for use are those sweeteners that do not degrade during either storage or more importantly, during the baking step. While degradation during storage and baking can be overcome by over fortifying with a high potency sweetener to compensate for the expected loss, such extra addition is costly. Preferred for use herein as the high potency heat tolerant sweetener is sucralose. The sucrolose can be conveniently added in a 25% solution. Good results are obtained when the sucrolose is added at about 0.05% to about 0.15%, preferably about 0.5%. In less preferred embodiments, the sucralose can be replaced with equivalent sweetness quantities of other known high potency sweeteners such as aspartame, potassium acetylsulfame, saccharine, cyclamate, and mixtures thereof, in their soluble salt(s) forms).

The present batters are preferably not highly acidified and range in pH from about 6.0 to 8.5. The combination of frozen temperature storage and use, and a low water activity is sufficient to maintain frozen storage stability.

In certain embodiments, the present articles can optionally further comprise an anti-mycotic ingredient such as sodium, potassium sorbate, calcium propionate, or parabens. While not needed to maintain storage stability, addition of such antimycotic ingredients is desired from a food quality standpoint in case a portion is allowed to warm to room temperature, refrigerated and reused. Preferred for use herein is methyl or propyl esters of parabens or combination thereof not exceeding 0.1% total. Most preferably the sodium salts of methyl and propyl esters of parabens can be used.

While the invention is specifically described in terms of improved baked goods, such as layer cakes, muffins, quick breads, cupcakes, biscuits, baked corn bread, the batters can be used for or formulated for use to prepare other cooked farinaceous goods within the scope of this invention including griddle cakes such as pancakes, crepes or cornbread, Irish soda bread or waffles. Also, while the present articles are especially suited for use for preparing leavened finished goods, other finished goods can also be prepared therefrom.

Batters for chocolate brownies or chocolate (e.g., "Devil's Food") cake are preferred herein and generally comprise about 2 to 12% cocoa, preferably about 4 to 10%.

The cocoa used in this invention is either natural or "Dutched" chocolate from which a substantial portion of the fat or cocoa butter has been expressed or removed by solvent extraction, by pressing, or by other means. Cocoa suitable for use in the process of this invention may contain from 1 to 30% fatty constituents.

Dutched chocolate is prepared by treating cocoa nibs with an alkali material such as potassium carbonate in a manner well known in the art. Generally, it tends to have a darker color and also can be more flavorful than natural cocoas.

Chocolate can be used in practicing the process of this invention and it is intended, therefore, that chocolate, as described above, to be encompassed by the term "cocoa". When chocolate is used, it should be in a finely divided form. It may be necessary to reduce the amount of shortening in the mix when chocolate is used because of the additional fat present as cocoa butter. It may also be necessary to add larger amounts of chocolate as compared to cocoa in order to provide an equivalent amount of flavoring and coloring.

Additionally hydrocolloids can be added as minor ingredients from 0–0.2%. Preferably Xanthan or Gellan gum may be added. However, other hydrocolloids such as guar, locust bean gum, carboxymethyl cellulose or others or mixtures thereof can be used to provide or improve beneficial textural attributes of the baked product.

When gellan gum or other calcium setting hydrophilic colloids are added to the batters, the batter can further beneficially comprise about 10 to 50 PPM soluble calcium. Calcium chloride or other calcium can provide the calcium salts.

Still another useful optional ingredient is starch. Starch addition can be used to influence a variety of product attributes including viscosity during baking, finished baked goods' volume and texture. The starch used can be any of the common food starches, for example, potato starch, corn starch, wheat starch, rice starch, barley starch, oat starch, tapioca starch, arrowroot, and sago starch. Modified starches and pregelatinized starches can also be used. If present, the added starch ingredient(s) can comprise about 0.1 to 10%, preferably about 1 to 8% of the frozen batter.

The present compositions can optionally contain a variety of additional minor ingredients or "conventional additives" suitable for rendering finished baked goods prepared therefrom more organoleptically desirable. Such optional dry mix components include anti-oxidants, flavor/coloring agents, salt, coloring agents, flavoring agents, flavor chips, nuts and fruit pieces, or other edible inclusions. Flavor chips include chocolate, mint chocolate, butterscotch, peanut butter chips and mixtures thereof. The flavor chips can be coated with topical film made of hard fat or edible shellac or others to minimize moisture and/or fat migration. If present, such optional components collectively comprise from about 1 to 25% of the batter of the present invention. In case of muffins, blueberries with controlled water activity are used so that water migration between the batter and blueberries are limited. The preferred water activity of the blueberries used is 0.85 however blueberries with lower water activities can be used.

Method of Preparation

The batters of the present invention are prepared by blending the essential and optional components together in such a manner as to produce a well blended batter chemically leavened to densities ranging from about 0.9 to 1.1 g/cc and thereafter quiescently freezing the batter to form the present scoopable frozen batter products herein. The chemically leavened batter preparation step can involve the substeps of preparing a batter and allowing the fast reacting baking acid to react with a portion of the baking soda to form the chemically leavened batter.

In a preferred method of preparation, the batter preparation can involve forming a first or dry pre-blend of the dry ingredients. The batter preparation can further involve forming a second or "wet" pre-blend of the wet and liquid ingredients. A portion of the water is used to prehydrate the emulsifiers. Thereafter, the liquid ingredients, hydrated emulsifiers, all or a portion of the humectants, liquid pasteurized eggs, maltose syrup, and oil are combined to form a wet mixture or emulsion. The wet mixture and dry pre-blend are then combined conditions to form a batter. The batter can, for example, be prepared in a batch or a continuous mixing device. Once the wet and dry ingredients are admixed, the fast reacting acid quickly reacts with a portion of the baking soda. In small batch operations, the reaction at room temperature takes about 10 to 20 seconds to form the leavened batter.

In certain embodiments, the liquid oil is directly added to either the dry ingredients or while blending liquid and dry ingredients. Emulsifiers are added as part of the liquid emulsion or as a separate emulsifier dispersion comprising water, emulsifiers, polyols such as glycerol or others, sugars such as maltose syrup etc.

The chemically leavened batter so formed can then be charged to desirably shaped and sized containers such as one-gallon or five-gallon plastic pails. The water activity of the batter prior to freezing ranges from about 0.85 to 0.5. Thereafter, the batter filled pails can be quiescently frozen to form the present complete ready-to-bake frozen batter products of the present invention. Conveniently, the batter containing pails are placed into freezers and frozen over time (e.g., one to eight hours) to form the frozen batters. In contrast to ice cream manufacturing that requires specialized manufacturing equipment to simultaneously perform agitation, aeration and freezing, no specially freezing equipment is needed. The batters can be simply stored at freezer temperatures (e.g., $-20°$ C. to $-5°$ C.) for extended times (e.g. up to six months).

For reasons that are unknown, it has been found that conventional mechanical aeration to incorporate air, $N_2$, $N_2O$, or other inert gases can not be substituted for the present chemical leavening herein.

The frozen batter maintains a pH within a range of 6.3 to 8 over a storage interval of at least about eight weeks.

In its method of use aspect, the present invention resides in methods of preparing finished baked goods from the present frozen batters. Conveniently, the present frozen batters are prepared into finished baked goods by simple addition while still frozen to a suitable baking container or pan and baking to form a finished baked good. Broadly, the frozen batter is scooped from its bulk container into desirably sized portions (e.g., from 1 to 8 oz, about 20 to 200 g), then charged into a baking container and thereafter baked for sufficient times, for example, at 160° to 218.3° C. (325° to 425° F.) for about 10 to 40 minutes to form a finished baked good.

It is an advantage that bulk quantities of the frozen batter can be scooped out such as with a common ice cream scoop into desired quantities of batter, e.g., about 1 to 8 oz. scoops. The frozen batter is then charged to the baking tins or baking paper cups. The solid or plastic form of the frozen batter in contrast to conventional liquid batters provides a further convenience. Not only is the plastic frozen batter easier to handle but also is less likely to spill or otherwise mishandle. Still another advantage is that unused portions of the bulk batter after partial use can be conveniently returned to frozen storage and used at a later time or occasion. The frozen batter can be baked immediately after being placed into the baking container without need for allowing the batter to thaw. If desired, however, the frozen batter can be allowed to rest or thaw for short times, e.g., up to four hours, without serious adverse effect.

Baking time depends on the thickness of the batter in the pan, with a longer bake time required for a thicker (higher) batter. Bake times range between about 10 to 45 minutes. The baking time can be modestly extended longer, e.g., about 10% longer, due to the batter being added to the baking container in a frozen state. The resultant finished baked goods are characterized by a highly moist but not sticky or tacky texture. The finished baked goods are further characterized by being expanded or leavened and typically have densities ranging from about 0.3 to 0.6 g/cc. The finished baked goods are ready for immediate consumption or can be prepared on a commercial scale for distribution.

While the present invention finds particular suitability for use in connection with baked items such as layer cakes, quick breads, coffee cakes, muffins, brownies, in another variation, the batters can be used to prepare skillet items such as pan cakes, crepes or items such as waffles.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes, which come within the meaning and range of equivalency of the claims, are intended to be embraced therein.

What is claimed is:

1. An aerated spoonable farinaceous complete frozen batter for use in preparing a leavened food product, said batter comprising:
    A. about 10 to 40% flour;
    B. about 20 to 40% (dry weight basis) of a high maltose syrup;
    C. about 10 to 25% of edible oil having a melting point of about $\leq 20°$ C.;
    D. about 0.5% to 5% of a chemical leavening system;
    E. about 1 to 8% of a humectant; and,
    F. a moisture content of about 5% to 20%; said batter having a browning-type reducing sugars content of less than about 5%, and
    wherein said batter is chemically leavened to a density of about 0.9 to 1 g/cc; and has a temperature of about $-20°$ C. to 0° C.

2. The batter article of claim 1 wherein the batter additionally comprises a high potency sweetener.

3. The batter article in claim 2 wherein the high potency sweetener is sucralose.

4. The batter article in claim 2 additionally comprising liquid eggs.

5. The batter article in claim 1 wherein the leavening system includes a fast acting baking acid and a slow acting baking acid.

6. The batter article in claim 1 wherein the batter additionally comprises about 3% to 5% of ground sugar.

7. The batter article in claim 6 wherein at least a portion of the ground sugar is sucrose.

8. The batter article in claim 1 wherein the weight ratio of high maltose syrup (dry basis) to moisture ranges from about 2–3:1.

9. The batter article in claim 1 additionally comprising about 0.1% to 6% of emulsifiers.

10. The batter article in claim 9 wherein at least a portion of the emulsifiers is prehydrated.

11. The batter article in claim 10 comprising about 20% to 30% of the high maltose syrup.

12. The batter article in claim 11 wherein the high maltose syrup is a high maltose corn syrup.

13. The batter article in claim 12 comprising 10% to 15% liquid oil.

14. The batter article in claim 13 comprising about 5% to 15% moisture.

15. The batter article of claim 13 wherein the liquid oil has a melting temperature of less than 15° C.

16. The batter article in claim 13 comprising about 0.5% to 4% salt.

17. The batter article in claim 1 wherein the humectant is selected from the group consisting of glycerol, sorbitol, xylitol, propylene glycol and mixtures thereof.

18. The batter article in claim 1 wherein the batter is substantially free of lactose.

19. A food preparation method, comprising the steps of:
    admixing to form a batter:
    A. about 10 to 40% flour;
    B. about 20 to 30% (dry weight basis) of a high maltose corn syrup;
    C. about 10 to 20% of edible oil having a melting point of about $\leq 20°$ C.;
    D. about 0.5% to 5% of a chemical leavening system, said chemical leavening system including a baking soda and a blend of baking acids including a fast acting baking acid and a slow acting baking acid;
    E. about 1 to 8% of a humectant selected from the group consisting of glycerol, sorbitol, xylitol, propylene glycol and mixtures thereof; and
    F. a moisture content of about 5% to 20%; and having a browning-type reducing sugars content of less than about 5%, forming a chemically leavened batter having a density of about 0.9 to 1.1 g/cc by allowing the fast acting baking acid to react with a portion of the baking soda; and,
    quiescently freezing the chemically leavened batter to form a scoopable frozen batter having a slow acting chemical leavening system.

20. The method of claim 19 wherein the forming step is practiced at room temperature.

21. The method of claim 20 wherein the admixing and forming steps are practiced simultaneously in a continuous mixer.

22. The food product prepared by the method of claim 21.

23. The method of claim 20 wherein the batter additionally comprises a high potency sweetener.

24. The method of claim 23 wherein the high potency sweetener is sucralose.

25. The food product prepared by the method of claim 24.

26. The food product prepared by the method of claim 23.

27. The food product prepared by the method of claim 20.

28. The method of claim 19 wherein the quiescently freezing step is practiced at a temperature ranging from about −20° C. to about −5° C.

29. The method of claim 28 wherein the admixing step involves a sub-step of forming a first dry preblend of ingredients and a second pre-blend of liquid ingredients.

30. The method of claim 29 wherein the admixing step involves a sub-step of forming an aqueous solution comprising about 15% to 30% sucralose and blending the sucralose solution with the second pre-blend of liquid ingredients.

31. The method of claim 30 wherein the weight ratio of the blend of fast and slow acting baking acids to the baking soda is about 0.75:1 to 1.25:1.

32. The method of claim 31 wherein the batter additionally comprises about 3% to 5% of ground sugar.

33. The food product prepared by the method of claim 32.

34. The food product prepared by the method of claim 31.

35. The food product prepared by the method of claim 30.

36. The food product prepared by the method of claim 29.

37. The food product prepared by the method of claim 28.

38. The food product prepared by the method of claim 19.

39. The method of claim 19 additionally comprising the steps of:

forming a portion of the batter in the form of a scoop;
   charging the scoop to a baking container; and, cooking to form a finished food product.

40. The method of claim 39 wherein the scoop includes about 1 to 12 oz. of frozen batter.

41. The method of claim 39 wherein the cooking step comprises baking at a temperature ranging from 300° F. to 450° F.

42. The method of claim 39 wherein the cooking step comprises pan frying to form a pancake.

* * * * *